(12) United States Patent
Wiese et al.

(10) Patent No.: US 6,950,243 B2
(45) Date of Patent: Sep. 27, 2005

(54) REFRACTIVE MULTISPECTRAL OBJECTIVE LENS SYSTEM AND METHODS OF SELECTING OPTICAL MATERIALS THEREFOR

(75) Inventors: Gary E. Wiese, Orlando, FL (US); Frank Dumont, Casselberry, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 51 days.

(21) Appl. No.: 10/417,129

(22) Filed: Apr. 17, 2003

(65) Prior Publication Data

US 2003/0214729 A1 Nov. 20, 2003

Related U.S. Application Data

(60) Provisional application No. 60/373,580, filed on Apr. 19, 2002.

(51) Int. Cl.$^7$ .............................. G02B 15/14; G02B 9/12
(52) U.S. Cl. ....................................... 359/689; 359/784
(58) Field of Search .................................. 359/689–692, 359/716, 717, 722, 784–785, 793–795; 250/495.1, 504 R, 339.11, 338.1

(56) References Cited

U.S. PATENT DOCUMENTS

| | | | |
|---|---|---|---|
| 3,567,304 A | 3/1971 | Kruger | |
| 4,537,464 A | * 8/1985 | Boutellier | .................... 359/785 |
| 4,702,569 A | 10/1987 | Mercado et al. | |
| 4,704,008 A | 11/1987 | Mercado | |
| 4,761,064 A | 8/1988 | Mercado | |
| 4,762,404 A | 8/1988 | Mercado | |
| 4,765,727 A | 8/1988 | Mercado | |
| 4,790,637 A | 12/1988 | Mercado et al. | |
| 5,020,889 A | 6/1991 | Mercado et al. | |
| 5,202,792 A | 4/1993 | Rollin | |
| 5,204,782 A | 4/1993 | Mercado et al. | |
| 5,210,646 A | 5/1993 | Mercado et al. | |
| 5,386,315 A | 1/1995 | Amon et al. | |
| 5,491,583 A | 2/1996 | Robb | |
| 5,532,880 A | 7/1996 | Robb | |
| 5,684,636 A | 11/1997 | Chow et al. | |
| 5,687,022 A | 11/1997 | Robb | |
| 5,781,336 A | 7/1998 | Coon et al. | |
| 5,838,489 A | 11/1998 | Erdmann | |
| 5,973,859 A | 10/1999 | Abe | |
| 6,226,132 B1 | 5/2001 | Abe | |

OTHER PUBLICATIONS

Deqing Ren et al., "Apochromatic lenses for near-infrared astronomical instruments," Optical Engineering, vol. 38, No. 3, Mar. 1999, pp. 537–542, Society of Photo-Optical Instrumentation Engineers, Bellingham, WA.

R.D. Sigler, "Glass Selection for Airspaced Apochromats using the Buchdahl Dispersion Equation," Applied Optics, vol. 25, No. 23, Dec. 1, 1986, pp. 4311–4320. Optical Society of America, Washington, D.C.

P. Hariharan, "Apochromatic Lens Combinations: A Novel Design Approach," Optics and Laser Technology, vol. 29, No. 4, Jun. 1, 997, pp. 217–219, Elsevier Science Publishers BV., Amsterdam, NL.

P. Hariharan, "Superachromatic Lens Combinations," Optics and Laser Technology, vol. 31, No. 2, Mar. 1999, pp. 115–118, Elsevier Science Publishers BV., Amsterdam, NL.

Thomas H. Jamieson, "Decade Wide Waveband Optics", SPIE vol. 3482, 1998, pp. 306–320, The International Society for Optical Engineering (SPIE), USA.

* cited by examiner

Primary Examiner—George Epps
Assistant Examiner—Alicia M Harrington
(74) Attorney, Agent, or Firm—Buchanan Ingersoll pc

(57) ABSTRACT

Refractive optical systems having first and second lens systems are transmissive to infrared radiation. The first lens system includes one of $BaF_2$ and $CaF_2$. An exemplary second lens system includes an optical material selected from at least spinel, $MgF_2$, and aluminum oxynitride. Such exemplary refractive optical systems provide correction of chromatic aberration in multiple wavelength bands.

14 Claims, 10 Drawing Sheets

Table I. Optical Properties of Some Materials for 0.7-5.0 microns

| Material | Index of Refraction | | | Abbe Numbers | | | Partial Dispersion | | | $V_3/V_1$ | $V_3/V_2$ |
|---|---|---|---|---|---|---|---|---|---|---|---|
| | Band 1 0.7-0.9 | Band 2 1.064-1.573 | Band 3 3.3-5.0 | Band 1 0.7-0.9 | Band 2 1.064-1.573 | Band 3 3.3-5.0 | Band 1 0.7-0.9 | Band 2 1.064-1.573 | Band 3 3.3-5.0 | | |
| AlON | 1.7790 | 1.7686 | 1.7047 | 121.061 | 95.835 | 11.818 | 0.5720 | 0.5247 | 0.4354 | 0.0976 | 0.1233 |
| AMTIR-1 | - | 2.5584 | 2.5135 | - | 31.380 | 237.001 | - | 0.7079 | 0.5787 | NA | 7.5526 |
| $As_2S_3$ | 2.5201 | 2.4482 | 2.4106 | 22.726 | 44.203 | 196.597 | 0.6144 | 0.6504 | 0.5365 | 8.6508 | 4.4476 |
| $BaF_2$ | 1.4701 | 1.4669 | 1.4559 | 191.399 | 229.415 | 50.777 | 0.5912 | 0.5683 | 0.4516 | 0.2653 | 0.2213 |
| $CaF_2$ | 1.4305 | 1.4272 | 1.4082 | 201.803 | 167.536 | 24.489 | 0.5739 | 0.5292 | 0.4460 | 0.1214 | 0.1462 |
| KBr | 1.5488 | 1.5410 | 1.5353 | 83.843 | 139.529 | 290.932 | 0.5968 | 0.6373 | 0.4923 | 3.4700 | 2.0851 |
| LiF | 1.3890 | 1.3846 | 1.3464 | 177.393 | 96.562 | 9.785 | 0.5520 | 0.4920 | 0.4415 | 0.0552 | 0.1013 |
| MgO | 1.7276 | 1.7178 | 1.6637 | 115.243 | 98.100 | 13.665 | 0.5756 | 0.5321 | 0.4417 | 0.1186 | 0.1393 |
| $MgAl_2O_4$ | 1.7070 | 1.7012 | 1.6823 | 123.665 | 91.857 | 10.205 | 0.5692 | 0.5180 | 0.4302 | 0.0825 | 0.1111 |
| $MgF_2$ | 1.3751 | 1.3718 | 1.3461 | 205.405 | 132.660 | 15.127 | 0.5616 | 0.5053 | 0.4411 | 0.0736 | 0.1140 |
| Sapphire | 1.7602 | 1.7502 | 1.6686 | 138.753 | 86.066 | 8.521 | 0.5603 | 0.5015 | 0.4318 | 0.0614 | 0.0990 |
| ZnS | 2.3136 | 2.2774 | 2.2515 | 42.457 | 73.500 | 133.018 | 0.6023 | 0.6393 | 0.4828 | 3.1330 | 1.8097 |
| ZnSe | 2.5242 | 2.4647 | 2.4326 | 28.547 | 53.611 | 218.382 | 0.6105 | 0.6483 | 0.5311 | 7.6499 | 4.0735 |

Table II. Primary Chromatic Aberation Factors in Bands 1 and 2 for Dual Material Systems

| | AlON | AMTIR-1 | As₂S₃ | BaF₂ | CaF₂ | KBr | LiF | MgO | MgAl₂O₄ | MgF₂ | Sapphire | ZnS | ZnSe |
|---|---|---|---|---|---|---|---|---|---|---|---|---|---|
| AlON | | NA 0.03299 | 0.04629 0.02340 | 0.00430 0.00252 | 0.00187 0.00180 | 0.01208 0.00703 | 0.02089 0.01081 | 0.01135 0.00865 | 0.00936 0.00758 | -0.00725 -0.00281 | 0.01098 0.00737 | 0.02504 0.01391 | 0.03656 0.01912 |
| AMTIR-1 | NA 0.03299 | | NA 0.07685 | NA 0.03937 | NA 0.03485 | NA -0.10138 | NA 0.03279 | NA 0.03319 | NA 0.03281 | NA 0.03353 | NA 0.03262 | NA 0.05523 | NA -0.04594 |
| As₂S₃ | 0.04629 0.02340 | NA 0.07685 | | 0.05751 0.02898 | 0.04956 0.02499 | -0.05492 -0.02504 | 0.04601 0.02327 | 0.04664 0.02355 | 0.04597 0.02327 | 0.04726 0.02388 | 0.04567 0.02312 | 0.08678 0.04149 | -0.04594 -0.01717 |
| BaF₂ | 0.00430 0.00252 | NA 0.03937 | 0.05751 0.02898 | | 0.00548 0.00286 | 0.01334 0.00776 | 0.00513 0.00293 | 0.00395 0.00221 | 0.00450 0.00272 | 0.00538 0.00301 | 0.00482 0.00289 | 0.03487 0.01931 | 0.04406 0.02298 |
| CaF₂ | 0.00187 0.00180 | NA 0.03485 | 0.04956 0.02499 | 0.00548 0.00286 | | 0.01257 0.00728 | 0.00450 0.00293 | 0.00026 0.00064 | 0.00272 0.00246 | 0.00510 0.00343 | 0.00375 0.00295 | 0.02775 0.01533 | 0.03883 0.02025 |
| KBr | 0.01208 0.00703 | NA -0.10138 | -0.05492 -0.02504 | 0.01334 0.00776 | 0.01257 0.00728 | | 0.01215 0.00706 | 0.01209 0.00702 | 0.01207 0.00703 | 0.01231 0.00715 | 0.01207 0.00703 | 0.00213 0.00174 | -0.05761 -0.02741 |
| LiF | 0.02089 0.01081 | NA 0.03279 | 0.04601 0.02327 | 0.00513 0.00293 | 0.00450 0.00305 | 0.01215 0.00706 | | 0.01635 0.00978 | 0.06520 0.02326 | 0.00346 0.00238 | -0.00494 0.00185 | 0.02498 0.01386 | 0.03641 0.01904 |
| MgO | 0.01135 0.00865 | NA 0.03319 | 0.04664 0.02355 | 0.00395 0.00221 | 0.00026 0.00064 | 0.01209 0.00702 | 0.01635 0.00978 | | 0.01042 0.00815 | -0.03072 -0.01727 | 0.01111 0.00783 | 0.02526 0.01400 | 0.03679 0.01922 |
| MgAl₂O₄ | 0.00936 0.00758 | NA 0.03281 | 0.04597 0.02327 | 0.00450 0.00272 | 0.00272 0.00246 | 0.01207 0.00703 | 0.06520 0.02326 | 0.01042 0.00815 | | -0.00180 0.00060 | 0.01253 0.00718 | 0.02484 0.01383 | 0.03635 0.01903 |
| MgF₂ | -0.00725 -0.00281 | NA 0.03353 | 0.04726 0.02388 | 0.00538 0.00301 | 0.00510 0.00343 | 0.01231 0.00715 | 0.00346 0.00238 | -0.03072 -0.01727 | -0.00180 0.00060 | | 0.00185 0.00227 | 0.02595 0.01438 | 0.03727 0.01948 |
| Sapphire | 0.01098 0.00737 | NA 0.03262 | 0.04567 0.02312 | 0.00482 0.00289 | 0.00375 0.00295 | 0.01207 0.00703 | -0.00494 0.00185 | 0.01111 0.00783 | 0.01253 0.00718 | 0.00185 0.00227 | | 0.02467 0.01374 | 0.03616 0.01894 |
| ZnS | 0.02504 0.01391 | NA 0.05523 | 0.08678 0.04149 | 0.03487 0.01931 | 0.02775 0.01533 | 0.00213 0.00174 | 0.02498 0.01386 | 0.02526 0.01400 | 0.02484 0.01383 | 0.02595 0.01438 | 0.02467 0.01374 | | 0.05291 0.02652 |
| ZnSe | 0.03656 0.01912 | NA 0.18686 | -0.04594 -0.01717 | 0.04406 0.02298 | 0.03883 0.02025 | -0.05761 -0.02741 | 0.03641 0.01904 | 0.03679 0.01922 | 0.03635 0.01903 | 0.03727 0.01948 | 0.03616 0.01894 | 0.05291 0.02652 | |

Fig. 8

TABLE III. Lens Power Factors for Dual Material Systems

| | AlON | AMTIR-1 | As₂S₃ | BaF₂ | CaF₂ | KBr | LiF | MgO | MgAl₂O₄ | MgF₂ | Sapphire | ZnS | ZnSe |
|---|---|---|---|---|---|---|---|---|---|---|---|---|---|
| AlON | | -0.05248<br>1.05248 | -0.06396<br>1.06396 | -0.30335<br>1.30335 | -0.93270<br>1.93270 | -0.04234<br>1.04234 | 5.81399<br>-4.81399 | -6.40044<br>7.40044 | 7.32633<br>-6.32633 | -3.57161<br>4.57161 | 3.58407<br>-2.58407 | -0.09751<br>1.09751 | -0.05721<br>1.05721 |
| AMTIR-1 | 1.05248<br>-0.05248 | | 5.86578<br>-4.86578 | 1.27266<br>-0.27266 | 1.11524<br>-0.11524 | -4.39452<br>5.39452 | 1.04307<br>-0.04307 | 1.06118<br>-0.06118 | 1.04500<br>-0.04500 | 1.06818<br>-0.06818 | 1.03729<br>-0.03729 | 2.27918<br>-1.27918 | 12.72899<br>-11.72899 |
| As₂S₃ | 1.06396<br>-0.06396 | | | 1.34821<br>-0.34821 | 1.14229<br>-0.14229 | -2.08403<br>3.08403 | 1.05238<br>-0.05238 | 1.07470<br>-0.07470 | 1.05475<br>-0.05475 | 1.08336<br>-0.08336 | 1.04530<br>-0.04530 | 3.09207<br>-2.09207 | -9.02442<br>10.02442 |
| BaF₂ | 1.30335<br>-0.30335 | -0.27266<br>1.27266 | -0.34821<br>1.34821 | | 1.93158<br>-0.93158 | -0.21143<br>1.21143 | 1.23872<br>-0.23872 | 1.36820<br>-0.36820 | 1.25153<br>-0.25153 | 1.42433<br>-0.42433 | 1.20165<br>-0.20165 | -0.61742<br>1.61742 | -0.30295<br>1.30295 |
| CaF₂ | 1.93270<br>-0.93270 | -0.11524<br>1.11524 | -0.14229<br>1.14229 | -0.93158<br>1.93158 | | -0.09191<br>1.09191 | 1.66551<br>-0.66551 | 2.26238<br>-1.26238 | 1.71444<br>-0.71444 | 2.61579<br>-1.61579 | 1.53360<br>-0.53360 | -0.22565<br>1.22565 | -0.12630<br>1.12630 |
| KBr | 1.04234<br>-0.04234 | 5.39452<br>-4.39452 | 3.08403<br>-2.08403 | 1.21143<br>-0.21143 | 1.09191<br>-0.09191 | | 1.03481<br>-0.03481 | 1.04928<br>-0.04928 | 1.03635<br>-0.03635 | 1.05485<br>-0.05485 | 1.03017<br>-0.03017 | 1.84232<br>-0.84232 | 4.01009<br>-3.01009 |
| LiF | -4.81399<br>5.81399 | -0.04307<br>1.04307 | -0.05238<br>1.05238 | -0.23872<br>1.23872 | -0.66551<br>1.66551 | -0.03481<br>1.03481 | | -2.52256<br>3.52256 | -23.32078<br>24.32078 | -1.83192<br>2.83192 | 7.73733<br>-6.73733 | -0.07941<br>1.07941 | -0.04691<br>1.04691 |
| MgO | 7.40044<br>-6.40044 | -0.06118<br>1.06118 | -0.07470<br>1.07470 | -0.36820<br>1.36820 | -1.26238<br>2.26238 | -0.04928<br>1.04928 | 3.52256<br>-2.52256 | | 3.94981<br>-2.94981 | -9.34360<br>10.34360 | 2.65648<br>-1.65648 | -0.11449<br>1.11449 | -0.06675<br>1.06675 |
| MgAl₂O₄ | -6.32633<br>7.32633 | -0.04500<br>1.04500 | -0.05475<br>1.05475 | -0.25153<br>1.25153 | -0.71444<br>1.71444 | -0.03635<br>1.03635 | 24.32078<br>-23.32078 | -2.94981<br>3.94981 | | -2.07334<br>3.07334 | 6.05890<br>-5.05890 | -0.08310<br>1.08310 | -0.04902<br>1.04902 |
| MgF₂ | 4.57161<br>-3.57161 | -0.06818<br>1.06818 | -0.08336<br>1.08336 | -0.42433<br>1.42433 | -1.61579<br>2.61579 | -0.05485<br>1.05485 | 2.83192<br>-1.83192 | 10.34360<br>-9.34360 | 3.07334<br>-2.07334 | | 2.28978<br>-1.28978 | -0.12832<br>1.12832 | -0.07442<br>1.07442 |
| Sapphire | -2.58407<br>3.58407 | -0.03729<br>1.03729 | -1.65648<br>2.65648 | -0.20165<br>1.20165 | -0.53360<br>1.53360 | -0.03017<br>1.03017 | -6.73733<br>7.73733 | -1.65648<br>2.65648 | -5.05890<br>6.05890 | -1.28978<br>2.28978 | | -0.06844<br>1.06844 | -0.04060<br>1.04060 |
| ZnS | 1.09751<br>-0.09751 | -1.27918<br>2.27918 | -2.09207<br>3.09207 | 1.61742<br>-0.61742 | 1.22565<br>-0.22565 | -0.84232<br>1.84232 | 1.07941<br>-0.07941 | 1.11449<br>-0.11449 | 1.08310<br>-0.08310 | 1.12832<br>-0.12832 | 1.06844<br>-0.06844 | | 2.55818<br>-1.55818 |
| ZnSe | 1.05721<br>-0.05721 | -11.72899<br>12.72899 | 10.02442<br>-9.02442 | 1.30295<br>-0.30295 | 1.12630<br>-0.12630 | -3.01009<br>4.01009 | 1.04691<br>-0.04691 | 1.06675<br>-0.06675 | 1.04902<br>-0.04902 | 1.07442<br>-0.07442 | 1.04060<br>-0.04060 | 2.55818<br>-1.55818 | |

Fig. 9

Table IV. Secondary Chromatic Aberration Factors in Band 3 for Dual Material Systems

| | AION | AMTIR-1 | As₂S₃ | BaF₂ | CaF₂ | KBr | LiF | MgO | MgAl₂O₄ | MgF₂ | Sapphire | ZnS | ZnSe |
|---|---|---|---|---|---|---|---|---|---|---|---|---|---|
| AION | | 0.00064 | 0.00055 | 0.00042 | 0.00084 | 0.00020 | -0.00299 | 0.00340 | 0.00323 | 0.00172 | 0.00110 | 0.00039 | 0.00046 |
| AMTIR-1 | 0.00064 | | 0.00104 | 0.00068 | 0.00062 | -0.00160 | 0.00060 | 0.00061 | 0.00065 | 0.00062 | 0.00064 | 0.00092 | 0.00256 |
| As₂S₃ | 0.00055 | 0.00104 | | 0.00058 | 0.00053 | -0.00047 | 0.00051 | 0.00052 | 0.00057 | 0.00053 | 0.00056 | 0.00084 | -0.00025 |
| BaF₂ | 0.00042 | 0.00068 | 0.00058 | | 0.00021 | 0.00017 | 0.00025 | 0.00027 | 0.00053 | 0.00029 | 0.00047 | 0.00038 | 0.00047 |
| CaF₂ | 0.00084 | 0.00062 | 0.00053 | 0.00021 | | 0.00017 | 0.00031 | 0.00040 | 0.00111 | 0.00052 | 0.00089 | 0.00034 | 0.00044 |
| KBr | 0.00020 | -0.00160 | -0.00047 | 0.00017 | 0.00017 | | 0.00018 | 0.00018 | 0.00022 | 0.00019 | 0.00021 | 0.00006 | -0.00053 |
| LiF | -0.00299 | 0.00060 | 0.00051 | 0.00025 | 0.00031 | 0.00018 | | 0.00005 | -0.02693 | -0.00007 | 0.00767 | 0.02032 | 0.00034 |
| MgO | 0.00340 | 0.00061 | 0.00052 | 0.00027 | 0.00040 | 0.00018 | 0.00005 | | 0.00332 | -0.00041 | 0.00192 | 0.00034 | 0.00044 |
| MgAl₂O₄ | 0.00323 | 0.00065 | 0.00057 | 0.00053 | 0.00111 | 0.00022 | -0.02693 | 0.00332 | | 0.00221 | -0.00095 | 0.00043 | 0.00048 |
| MgF₂ | 0.00172 | 0.00062 | 0.00053 | 0.00029 | 0.00052 | 0.00019 | -0.00007 | -0.00041 | 0.00221 | | 0.00141 | 0.00035 | 0.00044 |
| Sapphire | 0.00110 | 0.00064 | 0.00056 | 0.00047 | 0.00089 | 0.00021 | 0.00767 | 0.00192 | -0.00095 | 0.00141 | | 0.00041 | 0.00047 |
| ZnS | 0.00039 | 0.00092 | 0.00084 | 0.00038 | 0.00034 | 0.00006 | 0.02032 | 0.00034 | 0.00043 | 0.00035 | 0.00041 | | 0.00057 |
| ZnSe | 0.00046 | 0.00256 | -0.00025 | 0.00047 | 0.00044 | -0.00053 | 0.00034 | 0.00044 | 0.00048 | 0.00044 | 0.00047 | 0.00057 | |

TABLE V  DESIGN PARAMETERS FOR FIGURE 3 LENS SYSTEM

| SURFACE | RADIUS | THICKNESS | MEDIUM | REFRAC INDEX |
|---|---|---|---|---|
| 0 | 0.00000000 | 1.00000000E+20 | AIR | |
| 1 | 0.00000000 | 1.00000000 | AIR | |
| 2 | 11.24200000 | 0.50000000 | MATL  ZNS | 2.256030 |
| 3 | 21.41600000 | 0.02000000 | AIR | |
| 4 | 5.76800000 | 0.75000000 | BAF2 | 1.459936 |
| 5 | 33.27800000 | 0.02000000 | AIR | |
| 6 | 17.47400000 | 0.15000000 | SPINEL | 1.660036 |
| 7 | 10.97200000 | 0.30998400 | AIR | |
| 8 | 0.00000000 | 2.60000000 | AIR | |
| 9 | 0.00000000 | 0.00000000 | REFL | |
| 10 | 0.00000000 | -2.48910000 | AIR | |
| 11 | -2.54000000 | -0.20000000 | MATL  ZNS | 2.256030 |
| 12 | -2.00800000 | -0.05000000 | AIR | |
| 13 | -1.78200000 | -0.25000000 | BAF2 | 1.459936 |
| 14 | -3.93300000 | -0.19000000 | AIR | |
| 15 | 17.61900000 | -0.15000000 | MATL  ZNSE | 2.436052 |
| 16 | -3.99500000 | -1.37090000 | AIR | |
| 17 | 0.00000000 | 0.00000000 | AIR | |
| 18 | 0.00000000 | 0.00000000 | AIR | |

REFRACTIVE INDICES

| SURF | N1 | N2 | N3 | N4 | N5 | ABBE |
|---|---|---|---|---|---|---|
| 2 | 2.256030 | 2.253633 | 2.251268 | 2.248977 | 2.246621 | 531.258434 |
| 4 | 1.459936 | 1.457921 | 1.455717 | 1.453477 | 1.451024 | 208.682396 |
| 6 | 1.660036 | 1.646870 | 1.631882 | 1.615821 | 1.597976 | 44.037630 |
| 11 | 2.256030 | 2.253633 | 2.251268 | 2.248977 | 2.246621 | 531.258434 |
| 13 | 1.459936 | 1.457921 | 1.455717 | 1.453477 | 1.451024 | 208.682396 |
| 15 | 2.436052 | 2.434113 | 2.432428 | 2.430940 | 2.429510 | 851.881808 |

| WAVELENGTH NUMBER | 1 | 2 | 3 | 4 | 5 |
|---|---|---|---|---|---|
| WAVELENGTH (MICRON) | 3.30000 | 3.75000 | 4.19000 | 4.60000 | 5.00000 |

Fig. 10

REFRACTIVE MULTISPECTRAL OBJECTIVE LENS SYSTEM AND METHODS OF SELECTING OPTICAL MATERIALS THEREFOR

This application claims the benefit of U.S. Provisional Application No. 60/373,580, filed on Apr. 19, 2002, the entire contents of which are incorporated herein by reference.

BACKGROUND

1. Field of the Invention

The present invention relates to multispectral objective lens systems. More particularly, the present invention relates to a combination of refractive optical materials that permits correction of chromatic aberrations of an objective lens system in multiple wavelength bands in the infrared.

2. Background Information

Methods are known for selecting materials for lens systems that can provide correction of chromatic aberration. U.S. Pat. No. 5,210,646 "Color Corrected Optical systems and Method of Selecting Optical Materials Therefor" discloses a method for selecting optical materials to use in designing color-corrected optical systems. Optical systems are described therein using two different types of optical materials to obtain precise axial color correction at three, four or five wavelengths with only small chromatic aberration occurring at wavelengths between the precisely color-corrected wavelengths. For example, one method disclosed in U.S. Pat. No. 5,210,646 for choosing optical materials for a two-glass three-color lens doublet involves identifying a pair of materials for which the ratio of the primary dispersion coefficient to the secondary dispersion coefficient for one material is substantially equal to the same ratio for the other material.

The article "Decade wide waveband optics" by T. H. Jamieson (SPIE Vol. 3482, 1998, pp. 306–320) discloses a method for selecting materials for a lens system having correction for chromatic aberration over a decade-wide (or larger) wavelength band in the infrared (e.g., 0.55 $\mu$m to 5.5 $\mu$m, 1.5 $\mu$m to 15 $\mu$m, or 0.55 $\mu$m to 15 $\mu$m). The method involves identifying combinations of lens materials from a given set of materials, and evaluating for each combination the average defocus at a large number of wavelengths between control wavelengths. The average defocus is used as a discriminator for selecting combinations, and the sum of the absolute optical powers of the lenses (or absolute surface curvatures) is used as another discriminator. For the 0.55 $\mu$m to 5.5 $\mu$m band, for example, the Jamieson article discloses a lens doublet of CaF and MgO and a lens triplet of clear ZnS, BaF and LiF.

SUMMARY

According to one aspect of the invention, there is provided a method of selecting optical materials for an optical system having a first lens system and a second lens system, the first lens system comprising a first optical material and the second lens system comprising a second optical material, to provide correction of chromatic aberration of the optical system in first, second and third wavelength bands. The method comprises representing a first expression related to chromatic aberration of the optical system in the first wavelength band as a function of Abbe numbers of the first and second optical materials in the first and third wavelength bands, representing a second expression related to chromatic aberration of the optical system in the second wavelength band as a function of Abbe numbers of the first and second optical materials in the second and third wavelength bands, and comparing pairs of values calculated from the first and second expressions for potential combinations of the first and second optical materials determined from a set of optical materials. The method also comprises making a choice for the first and second optical materials from the set of optical materials based upon the comparison of pairs of values calculated from the first and second expressions, wherein the first and second expressions provide for correction of chromatic aberration in the third wavelength band.

According to another aspect of the invention, there is provided a method of selecting optical materials for an optical system having a first lens system and a second lens system, the first lens system comprising a first optical material and the second lens system comprising a second optical material, to provide correction of chromatic aberration of the optical system in first, second and third wavelength bands. The method comprises providing a first set of values indicative of chromatic aberration of the optical system in the first wavelength band, the first set of values corresponding to potential combinations of first and second optical materials determined from a set of optical materials, providing a second set of values indicative of chromatic aberration of the optical system in the second wavelength band, the second set of values corresponding to said potential combinations of first and second optical materials, and providing a third set of values indicative of an optical power of the first lens system and a fourth set of values indicative of an optical power of the second lens system, the third and fourth sets of values corresponding to said potential combinations of first and second optical materials, the third and fourth sets of values being generated in accordance with correction of chromatic aberration in the third wavelength band. The method also comprises comparing pairs of values from the first and second sets of values for said potential combinations of the first and second optical materials, comparing pairs of values from the third and fourth sets of values for said potential combinations of the first and second optical materials, and making a choice for the first and second optical materials based upon the comparison of pairs of values from the first and second sets of values for said potential combinations of the first and second optical materials and based upon the comparison of pairs of values from the third and fourth sets of values for said potential combinations of the first and second optical materials.

According to another aspect of the invention, there is provided a refractive optical system transmissive to infrared radiation. The refractive optical system comprises a first lens system comprising $BaF_2$, and a second lens system comprising an optical material selected from spinel, sapphire, $MgF_2$, MgO, and aluminum oxynitride.

According to another aspect of the invention, there is provided a refractive optical system transmissive to infrared radiation. The refractive optical system comprises a first lens system comprising $CaF_2$, and a second lens system comprising an optical material selected from spinel, sapphire, $MgF_2$, and aluminum oxynitride.

BRIEF DESCRIPTION OF THE FIGURES

Objects and advantages of the present invention will become apparent to those skilled in the art upon reading the following detailed description of exemplary embodiments, in conjunction with the accompanying drawings.

FIG. 6 depicts Table I, a tabulation of optical properties of some materials for 0.7–5.0 microns.

FIG. 7 depicts Table II, a tabulation of primary chromatic aberration factors in bands 1 and 2 for dual material systems.

FIG. 8 depicts Table III, a tabulation of lens power factors for dual material systems.

FIG. 9 depicts Table IV, a tabulation of secondary chromatic aberration factors in band 3 for dual material systems.

FIG. 10 depicts Table V, a tabulation of design parameters for a lens system.

DETAILED DESCRIPTION

Tactical fire control systems typically comprise several sensors to enhance the effectiveness of the platforms that carry them (e.g., aircraft, ground vehicles, surface ships). A typical suite of sensors includes (1) a laser designator/ranger operating at a wavelength of 1.06 microns, plus an eye-safe wavelength such as 1.57 microns, (2) an infrared imaging sensor operating at either 3–5 microns (MWIR) or 8–12 microns (LWIR), and (3) a laser spot tracker (LST) operating at 1.06 and 1.57 microns. In some instances, a television sensor operating at 0.7–0.9 micron (NIR) is also desirable.

The present invention provides a refractive multispectral objective lens system, as well as a method for selecting materials therefor, that allows multiple sensors for multiple wavelength ranges to use a common aperture. This is particulary advantageous for high speed airborne applications in order to minimize drag. Thus, multiple sensor optical systems share the same forward-most optical components.

For systems with widely disparate spectral operating wavelength bands, it is desirable to find optical materials that will efficiently transmit optical radiation in all bands, that will withstand the demanding environmental requirements of a tactical system, that are available in sufficiently large pieces, and that will permit the correction of optical aberrations simultaneously in all wavelength bands. The present invention addresses correction of chromatic aberrations in multiple wavelength bands, which is one of the more challenging requirements because of the non-linearity of the refractive index of materials versus wavelength. In general, the more disparate the wavelength bands are, the more the non-linearity is manifested.

Figure 1:
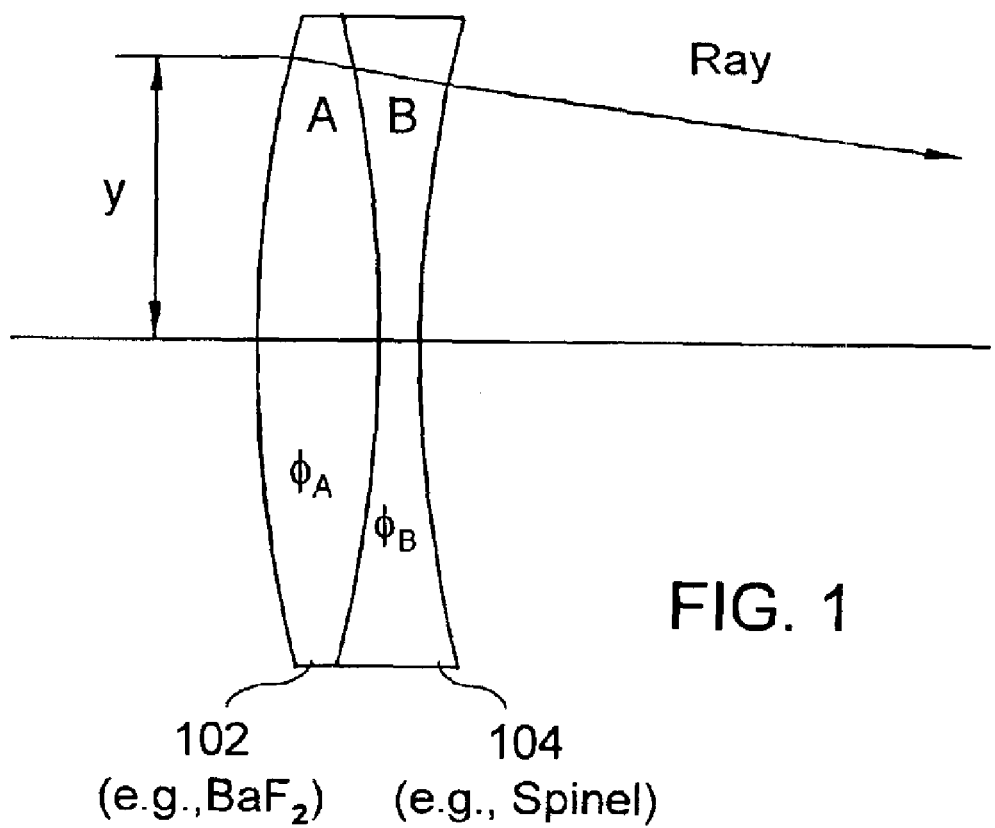
FIG. 1 is a cross-sectional view of a refractive optical system according to an exemplary embodiment of the present invention.

One approach for correcting chromatic aberration is to combine two lenses in such a way that the chromatic aberrations of the two lenses correct each other. FIG. 1 shows an exemplary optical system 100 according to the present invention comprising a first lens system 102 (e.g., a single BaF$_2$ lens) and a second lens system 104 (e.g., a single spinel (MgAl$_2$O$_4$) lens). The first and second lens systems 102 and 104 can each comprise more than one lens if desired. In addition, although the lens systems 102 and 104 are shown as being in contact, they can also be separated from each other. For purposes of further discussion, the first lens system 102 is designated as comprising a first optical material "A", and the second lens system 104 is designated as comprising a second optical material "B". For convenience, the lenses illustrated in FIG. 1 may also be referred to below as "lens A" and "lens B". The first lens system 102 is illustrated as having a positive optical power $\phi_A$, and the second lens system 104 is illustrated as having a negative optical power $\phi_B$, but the signs of the optical powers could be reversed. Under the thin lens approximation, the total optical power $\phi$ of a combination of lenses as illustrated in FIG. 1 is $$\phi = \phi_A + \phi_B. \tag{1}$$

Consider a spectral band that runs from $\lambda_1$ to $\lambda_3$, with $\lambda_2$ being a wavelength between $\lambda_1$ and $\lambda_3$. Let the refractive indices at $\lambda_1$, $\lambda_2$, and $\lambda_3$ be $n_{A1}$, $n_{A2}$, and $n_{A3}$, respectively for optical material A and $n_{B1}$, $n_{B2}$, and $n_{B3}$ for optical material B. For $\lambda_1 < \lambda_2 < \lambda_3$, it is always true that $n_1 > n_2 > n_3$ for either lens system. The dispersion of the materials is characterized by a quantity known as the Abbe number V, defined for the two optical materials as $$V_A = \frac{n_{A2} - 1}{n_{A1} - n_{A3}} \tag{2}$$

and $$V_B = \frac{n_{B2} - 1}{n_{B1} - n_{B3}}. \tag{3}$$

The powers of the lens systems 102 and 104 required to correct the axial chromatic aberration for the combination of optical materials in a given wavelength band are $$\phi_A = \left\{\frac{V_A}{V_A - V_B}\right\}\phi \tag{4}$$

and $$\phi_B = \left\{-\frac{V_B}{V_A - V_B}\right\}\phi, \tag{5}$$

where $\phi$ is a predetermined total optical power of the optical system known from system design considerations (e.g., the overall design considerations for a forward looking infrared (FLIR) camera may require a refractive objective lens system to have a particular optical power). The blur radius $\epsilon$ due to primary axial chromatic aberration for a single lens is $$\epsilon = -2Fy^2\phi\frac{1}{V}. \tag{6}$$

For the combination of two lenses of different optical materials A and B, the chromatic blur radius of a ray at input height y at lens A is $$\epsilon = -2Fy^2\left(\frac{\phi_A}{V_A} - \frac{\phi_B}{V_B}\right), \tag{7}$$

where F is the f/number of the combination. As known to those skilled in the art, primary axial chromatic aberration is axial chromatic aberration at end points of a given wavelength band. Secondary axial chromatic aberration is axial chromatic aberration at an intermediate wavelength of a given wavelength band.

To correct the primary axial chromatic aberration in a single wavelength band, a choice of lens materials can be made such that $$\frac{\phi_A}{V_A} = \frac{\phi_B}{V_B}. \quad (8)$$

A challenge, however, is that the Abbe numbers change, often significantly, from one sensor wavelength band to another. Table I shows the Abbe numbers and other optical data of some optical materials for three exemplary wavelength bands: 0.7–0.9 microns (Band 1), 1.064–1.573 microns (Band 2), and 3.3–5.0 microns (Band 3). Table I includes data for sapphire and $MgF_2$, which are birefringent materials, and the data shown in Table I (and in Tables II–IV) for sapphire and $MgF_2$ are for ordinary rays. AMTIR-1, another material reflected in Tables I–IV, is an amorphous material having the composition $Ge_{33}As_{12}Se_{55}$ and is manufactured by Amorphous Materials, Inc.

Figure 2:
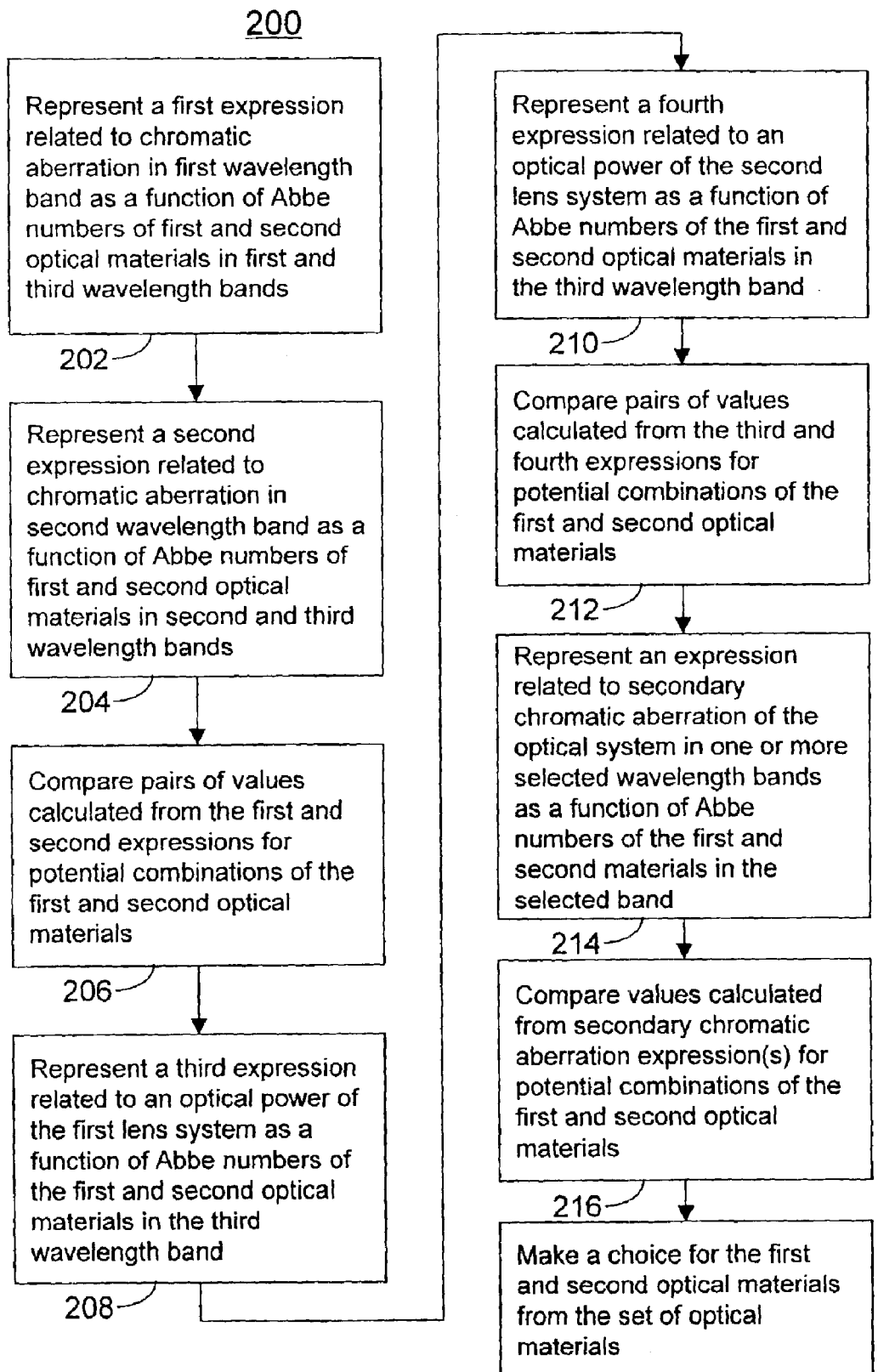
FIG. 2 is a flow chart of a method for selecting optical materials according to an exemplary aspect of the present invention.

FIG. 2 is a flow diagram illustrating a method 200 of selecting optical materials for an optical system having a first lens system and a second lens system to provide correction of chromatic aberration of the optical system in first, second and third wavelength bands according to an exemplary aspect of the present invention. The first lens system comprises a first optical material and the second lens system comprises a second optical material, such as shown, for example, in FIG. 1. The method 200 comprises representing a first expression related to chromatic aberration of the optical system in the first wavelength band as a function of Abbe numbers of the first and second optical materials in the first and third wavelength bands (step 202) and representing a second expression related to chromatic aberration of the optical system in the second wavelength band as a function of Abbe numbers of the first and second optical materials in the second and third wavelength bands (step 204). For example, if the lens powers required to correct the primary axial chromatic aberration for a third wavelength band are calculated in accordance with Equations 4 and 5 for a given pair of lens materials A and B, the chromatic blur radii in first and second wavelength bands are given by the following equations $$\epsilon_1 = -2Fy^2\phi\left\{\frac{1}{V_{A3}-V_{B3}}\left(\frac{V_{A3}}{V_{A1}} - \frac{V_{B3}}{V_{B1}}\right)\right\} \quad (9)$$

$$\epsilon_2 = -2Fy^2\phi\left\{\frac{1}{V_{A3}-V_{B3}}\left(\frac{V_{A3}}{V_{A2}} - \frac{V_{B3}}{V_{B2}}\right)\right\}, \quad (10)$$

wherein $V_{A1}$ is the Abbe number of first optical material in the first wavelength band, $V_{A2}$ is the Abbe number of first optical material in the second wavelength band, $V_{A3}$ is the Abbe number of first optical material in the third wavelength band, $V_{B1}$ is the Abbe number of second optical material in the first wavelength band, $V_{B2}$ is the Abbe number of second optical material in the second wavelength band, and $V_{B3}$ is the Abbe number of second optical material in the third wavelength band. Thus, each equation for the blur radius in the first and second wavelength bands is a product of a factor that depends only on system properties (F and y) and an expression related to chromatic aberration that depends only on material dispersion properties (the Abbe numbers). Thus, the first expression related to chromatic aberration can be, for example, the bracketed expression in Equation 9, and second expression related to chromatic aberration can be, for example, the bracketed expression in Equation 10. Of course, various levels of approximation and detail can be utilized in the mathematical characterization of lens systems. Accordingly, the invention is not intended to be limited to the above-described first and second expressions related to chromatic aberration, and any suitable choices for the first and second expressions can be used to the extent that those expressions are related to chromatic aberration and depend upon the above-noted Abbe numbers in some form.

The method 200 also comprises comparing pairs of values calculated from the first and second expressions for potential combinations of the first and second optical materials determined from a set of optical materials (step 206). Table II, for example, provides values calculated from the first and second expressions for binary combinations (pairs) of a set of thirteen different optical materials. In each cell of the table there are two entries. The upper entry is the value of the bracketed expression of Equation 9 evaluated for wavelength band 1 corresponding to 0.7–0.9 microns. The lower entry is the value of the bracketed expression of Equation 10 evaluated for wavelength band 2 corresponding to 1.064–1.573 microns. The upper right diagonal half of Table II is identical to the lower left diagonal half. The two halves represent simply interchanging materials A and B. It will be noted that the values shown in Table II do not have units because they are derived from ratios of Abbe numbers.

One way of comparing the pairs of values calculated from the first and second expressions for potential combinations of the first and second materials, for example, is to identify a number of pairs of values that are numerically the smallest. It is evident from Equations 9 and 10 that desirable combinations (pairs) of materials are those for which the factor in brackets is small for both the first and second wavelength bands. As some of the values in Table II are negative, this can be done using absolute values. In Table II, seventeen pairs of optical materials with the lowest values corresponding to the first and second expressions are highlighted with thick-lined borders.

Another way of comparing the pairs of values calculated from the first and second expressions is to identify those pairs of values for which each value is less than a predetermined amount. The highlighted combinations in Table II represent those pairs of values in which each value is below a predetermined amount of 0.006. Of course, other values, e.g., lower values such as 0.005, 0.004, 0.003, and 0.002 can be used.

Determining a suitable choice for such a predetermined amount is within the purview of one skilled in the art in view of the teachings herein and can be carried out based upon design constraints and system parameters. For example, in view of design constraints, one skilled in the art can determine a tolerable value for chromatic blur in the first wavelength band and a tolerable value for chromatic blur in the second wavelength band. Then, this tolerable value can be divided by $(-2Fy^2\phi)$, which can be determined by one skilled in the art from known system parameters. In this manner, a predetermined amount for the bracketed quantity in either equation 9 and/or 10 can be solved from the tolerable blur value and the quantity $(-2Fy^2\phi)$. A resulting value thus determined can then be used as the predetermined amount. Alternatively, separate predetermined amounts (e.g., first and second predetermined amounts) corresponding to the separate bracketed quantities in equations 9 and 10 can also be used. Using this predetermined amount (or amounts), the bracketed quantities in equations 9 and 10 can be calculated for various combinations of materials to determine one or more suitable combinations of first and second optical materials that yield bracketed quantities less than or equal to the predetermined amount (or amounts).

The method 200 further comprises making a choice for the first and second optical materials from the set of optical materials based upon the comparison of pairs of values calculated from the first and second expressions (step 218). This choice can depend primarily on the pairs of chromatic aberration values calculated from the first and second expressions (e.g., the pair with the lowest chromatic aberration values or those values below a certain predetermined amount), or the choice can further be based upon additional considerations, such the availability and cost of materials, the level of difficulty associated with working and polishing certain materials, and other materials properties (e.g., whether hygroscopic), for example.

In addition, in accordance with above-described exemplary method 200, the first and second expressions provide for correction of chromatic aberration in the third wavelength band (e.g., complete correction of primary chromatic aberration). In this regard, for example, Equations 9 and 10 are based in part upon Equations 4 and 5, which reflect corrected primary chromatic aberration, e.g., in the third wavelength band. However, it will be recognized that further optimization of an optical system according to the present invention can be carried out such that actual optical powers of the first and second lens systems chosen according to the present invention may deviate, for example, from values given by Equations 4 and 5. Thus, in this exemplary aspect of the invention, it is contemplated that the first and second expressions provide for correction of chromatic aberration, but this language is not intended to limit the present invention to an arrangement in which the chromatic aberration (e.g., primary chromatic aberration) in the third wavelength band is substantially zero. Optimization of optical systems in which adjustments are made, for example, to correct spherical or other aberrations, or to achieve target parameters such as wavefront error, spot size, and angular deviation, is well known to those of ordinary skill in the art. Such optimization can be done, for example, after a suitable pair of optical materials are chosen by the above-described method 200, and can be carried out with the aid of conventional optical design software programs, such as ACCOS V™ by Optikos Corporation, Code V by Optical Research Associates, and ZEMAX® by ZEMAX Development Corp.

Optionally, prior to making the choice for the first and second optical materials, the method 200 can also comprise representing a third expression related to an optical power of the first lens system as a function of Abbe numbers of the first and second optical materials in the third wavelength band (step 208) and representing a fourth expression related to an optical power of the second lens system as a function of Abbe numbers of the first and second optical materials in the third wavelength band (210). For example, the bracketed expression in Equation 4 can serve as the third expression, and the bracketed expression in Equation 5 can serve as the fourth expression. The method 200 can further comprise comparing pairs of values calculated from the third and fourth expressions for potential combinations of the first and second optical materials determined from the set of optical materials (step 212). The third and fourth expressions (e.g., the bracketed expressions in Equations 4 and 5) can be viewed as lens power factors for the first and second lens systems.

Table III provides exemplary values of third and fourth expressions corresponding to the bracketed expressions of Equations 4 and 5 for the potential combinations of first and second materials identified in Table II. The highlighted combinations are the same highlighted combinations that were identified in Table II. Comparing these values for different potential combinations of the first and second optical materials can be beneficial because lower absolute values of these lens power factors correspond to lower individual powers of the first and second lens systems. Utilizing a combination of materials that provides for relatively lower individual optical powers can reduce other aberrations (e.g., spherical aberration) because the curvatures of the resulting lenses are comparatively lower. For example, it can be beneficial to select candidate pairs of materials for which the absolute values bracketed quantities in Equations 4 and 5 are less than 2.0 or less than 1.5, for example. Relatively smaller values are preferable to relatively higher values for reasons discussed above. Thus, for example, whereas the combination of $CaF_2$ and AlON (aluminum oxynitride, e.g., AlON™) has somewhat lower primary chromatic aberration than the combination of $BaF_2$ and AlON as reflected in Table II, the combination $BaF_2$/AlON has lower lens power factors than the combination $CaF_2$/AlON. Thus, the combination $BaF_2$/AlON can be preferable to the combination $CaF_2$/AlON to the extent that differences in lens power factors might outweigh the differences in primary chromatic aberration. The same can be true if spinel ($MgAl_2O_4$) is substituted for AlON in the above-noted exemplary combinations.

Thus, making the choice for the first and second optical materials can also be based upon the comparison of values calculated from the third and fourth expressions as well as the comparison of values calculated for the first and second expressions.

Optionally, prior to making the choice for the first and second optical materials, the method 200 can also comprise representing one or more expressions related to secondary chromatic aberration of the optical system in one or more selected wavelength bands of the first, second and third wavelength bands as a function of Abbe numbers of the first and second optical materials in the selected wavelength band (step 214). In this regard, for example, a blur radius corresponding to secondary chromatic aberration for a dual-material lens system can be written as $$\epsilon_* = -2Fy^2\phi\left\{\frac{P(\lambda_i)_A - P(\lambda_i)_B}{(V_A - V_B)}\right\} \quad (11)$$

where $P(\lambda_i)_A$ is the partial dispersion for the first optical material (A) at an intermediate wavelength $\lambda_i$ in a selected wavelength band, $P(\lambda_i)_B$ is the partial dispersion for the second optical material (B) at the intermediate wavelength $\lambda_i$ in the selected band, $V_A$ and $V_B$ are the Abbe numbers for the first and second materials, respectively, in the selected band, and F, y and $\phi$ are as discussed previously. In this regard, the bracketed expression in Equation 11 can serve as the expression related to secondary chromatic aberration in each of the selected wavelength bands. In an exemplary aspect, the intermediate wavelength can be chosen at the center of each selected band or at a different location in each selected band. The third wavelength band can be a selected wavelength band, for example, and the bracketed expression in Equation 11 can be evaluated for combinations of materials using data for the third wavelength band.

Table IV provides exemplary values of the expression related to secondary chromatic aberration (e.g., the bracketed factor in Equation 11) in the third exemplary wavelength band (3.3–5.0 microns) for the potential combinations of first and second materials identified in Table II, and these values can be viewed as secondary chromatic aberration factors. The highlighted combinations are the same highlighted combinations that were identified in Table II.

The method 200 can further comprise comparing values calculated from each expression related to secondary chromatic aberration for potential combinations of the first and second optical materials identified from the set of optical materials (step 216). Comparing the values in Table IV, for example, for different potential combinations of the first and second optical materials can be beneficial because secondary chromatic aberration is often a concern as well as primary chromatic aberration. Values in Table IV can be compared, for example, for various candidate pairs of materials determined from an assessment of values from Table III and/or Table II. For example, the combination $BaF_2/AlON$ has a secondary chromatic aberration factor lower in Table IV than that for the combination $CaF_2/AlON$. Thus, the combination $BaF_2/AlON$ can be preferable to the combination $CaF_2/AlON$ to the extent that the difference in secondary chromatic aberration is important. The same can be true if spinel ($MgAl_2O_4$) is substituted for AlON in the above-noted exemplary combinations.

Another approach for comparing values calculated from the expression related to secondary chromatic aberration can involve identifying candidate pairs of materials from which to make the choice for the first and second optical materials based upon the values calculated from the first and second expressions, and identifying values of the expression related to secondary chromatic aberration that are below a predetermined amount. Determining a suitable choice for the predetermined amount associated with secondary chromatic aberration is within the purview of one skilled in the art in view of the teachings herein and can be carried out based upon design constraints and system parameters. For example, in view of design constraints, one skilled in the art can determine a tolerable value for secondary chromatic blur in the third wavelength band. Then, this tolerable value can be divided by $(-2Fy^2\phi)$, which can be determined by one skilled in the art from known system parameters. In this manner, a predetermined amount for the bracketed quantity in Equation 11 can be solved from the tolerable blur value and the quantity $(-2Fy^2\phi)$. A resulting value thus determined can then be used as the predetermined amount. Using this predetermined amount, the bracketed quantity in Equation 11 can be calculated for the potential combinations of first and second materials to determine one or more combinations that yield a value less than or equal to the predetermined amount.

In one aspect of the present invention, an exemplary predetermined amount for the expression related to secondary chromatic aberration can be chosen to be approximately 0.1 multiplied by the predetermined amount for either the first or second expressions related to chromatic aberration. Thus, exemplary values for the predetermined amount for the expression related to secondary chromatic aberration can be 0.0006, 0.0005, 0.0004, 0.0003, and 0.0002, for example.

Thus, the choice for the first and second optical materials can also be based upon the comparison of values calculated from the expression related to secondary chromatic aberration as well as the values of the first, second, third and fourth expressions referred to above.

It should be noted, that although steps 208–212 are illustrated prior to steps 214 and 216 in FIG. 2, the order could be reversed such that steps 214 and 216 come before steps 208–212. Moreover, steps 208–212 can be carried out without steps 214 and 216, and vice versa.

In the exemplary method 200 as described above, the first, second and third wavelength bands can be 0.7–0.9 microns, 1.064–1.573 microns, and 3.3–5.0 microns, respectively. However, the invention is not intended to be limited to these selections, and method 200 can be applied to any suitable choice of the wavelength bands.

Figure 3:
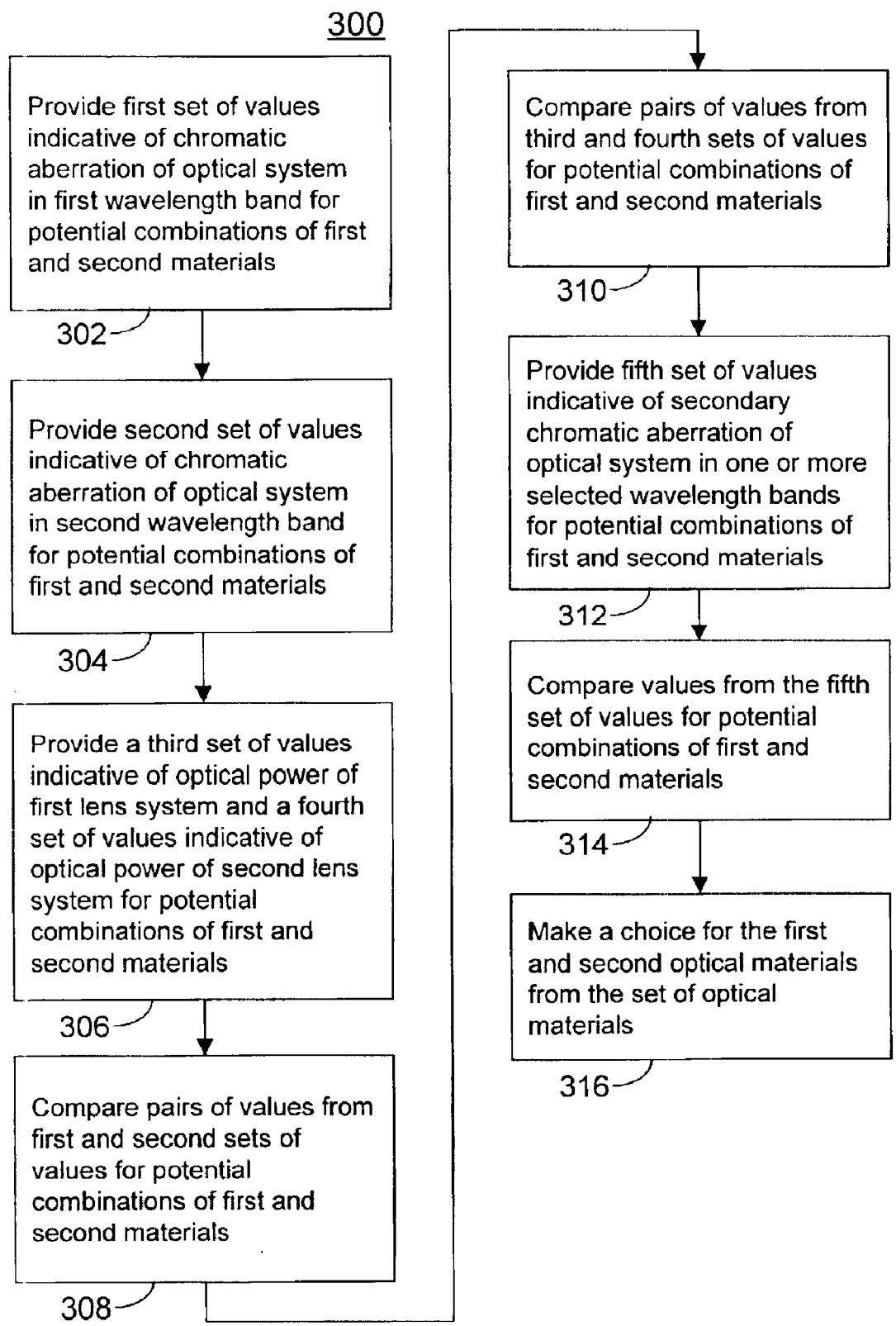
FIG. 3 is a flow chart of a method for selecting optical materials according to an exemplary aspect of the present invention.

FIG. 3 illustrates a flow diagram of an exemplary method 300 of selecting optical materials for an optical system having a first lens system and a second lens system, the first lens system comprising a first optical material and the second lens system comprising a second optical material, to provide correction of chromatic aberration of the optical system in first, second and third wavelength bands. The method comprises providing a first set of values indicative of chromatic aberration of the optical system in the first wavelength band, the first set of values corresponding to potential combinations of first and second optical materials determined from a set of optical materials (step 302). For example, the upper ones of the pairs of values illustrated in Table II can be used as the first set of values, these values being calculated from the bracketed expression in Equation 9 as discussed previously. However, the invention is not limited to this choice of the first set of values, and any suitable set of values can be used to the extent that the values are indicative of chromatic aberration of the optical system in the first wavelength band. For example, those skilled in the art will recognize that various levels of approximation and detail can be used to mathematically describe optical systems, and, accordingly, measures of chromatic aberration other than the exemplary ones described herein might be used. This consideration also applies to optical powers, for example.

The method further comprises providing a second set of values indicative of chromatic aberration of the optical system in the second wavelength band, the second set of values corresponding to the potential combinations of first and second optical materials (step 304). For example, the lower ones of the pairs of values illustrated in Table II can be used as the second set of values, these values being calculated from the bracketed expression in Equation 10 as discussed previously. However, the invention is not limited to this choice of the second set of values, and any suitable set of values can be used to the extent that the values are indicative of chromatic aberration of the optical system in the first wavelength band.

The method further comprises providing a third set of values indicative of an optical power of the first lens system and a fourth set of values indicative of an optical power of the second lens system, the third and fourth sets of values corresponding to said potential combinations of first and second optical materials, the third and fourth sets of values being generated in accordance with correction of chromatic aberration in the third wavelength band (step 306). For example, the upper ones of the pairs of values illustrated in Table III can be used as the third set of values, these being calculated from the bracketed expression in Equation 4, and the lower ones of the pairs of values illustrated in Table III can be used as the fourth set of values, these being calculated from the bracketed expression in Equation 5. However, the invention is not limited to these choices, and any suitable third and fourth sets of values can be used to the extent that the sets of values are indicative of an optical power of the first optical system and an optical power of the second optical system, respectively.

The method further comprises comparing pairs of values from the first and second sets of values for said potential combinations of the first and second optical materials (step 308) and comparing pairs of values from the third and fourth sets of values for said potential combinations of the first and second optical materials (step 310).

The method further comprises making a choice for the first and second optical materials based upon the comparison of pairs of values from the first and second sets of values for said potential combinations of the first and second optical materials and based upon the comparison of pairs of values from the third and fourth sets of values for said potential combinations of the first and second optical materials (step 316). With regard to the comparing step 310 and the choosing step 316, the considerations discussed with regard to method 200 above are applicable. For example, the comparisons and choice of the first and second materials can be based upon identifying combinations with the lowest values or identifying combinations with values lower than predetermined amounts. Also, additional factors, such as material cost and availability, difficulty of processing given materials, etc., can be considered.

Optionally, prior to making the choice of the first and second materials, the method 300 can further comprise providing a fifth set of values indicative of secondary chromatic aberration of the optical system one or more selected wavelength bands of the first, second and third wavelength bands (e.g., the third wavelength band), the fifth set of values corresponding to said potential combinations of first and second optical materials (step 312). For example, the values illustrated in Table IV can be used as the fifth set of values, these being calculated from the bracketed expression in Equation 11. However, the invention is not limited to this choice, and any suitable fifth set of values can be used to the extent that the values are indicative of secondary chromatic aberration of the optical system in one or more selected wavelength bands (e.g., the third wavelength band).

The method can also comprise comparing values from the fifth set of values for said potential combinations of the first and second optical materials (step 314) and utilizing this comparison in making the choice for the first and second optical materials. In this regard, the considerations relating to comparisons based upon secondary chromatic aberration discussed with regard to method 200 above are applicable.

In the exemplary method 300 as described above, the first, second and third wavelength bands can be 0.7–0.9 microns, 1.064–1.573 microns, and 3.3–5.0 microns, respectively. However, the invention is not intended to be limited to these selections, and method 300 can be applied to any suitable choices of the wavelength bands.

It will be apparent to those skilled in the art that the methods 200 and 300 can be implemented using computer software (e.g., database programs) for execution using a personal computer, for example, to provide a fast and efficient way to carry out the methods.

In another exemplary aspect of the present invention, there is provided a refractive optical system transmissive to infrared radiation. The refractive optical systems comprises a first lens system comprising $BaF_2$. The refractive optical systems further comprises a second lens system comprising an optical material selected from spinel, sapphire, $MgF_2$, MgO, and aluminum oxynitride. It will be apparent to those skilled in the art that these selections of materials can be generated according to the methods previously described herein. An exemplary optical system 100 according to the present invention is illustrated in FIG. 1, which shows a first lens system 102 and a second lens system 104. One of the lens systems can have a positive optical power, and the other of the lens systems can have a negative optical power. In the example of FIG. 1, the first lens system 102 and the second lens system 104 are each represented by a single lens (e.g., $BaF_2$ and spinel, respectively), but multiple lenses can make up each of the lens systems 102 and 104. For example, the single $BaF_2$ lens illustrated in FIG. 1 could be replaced by two $BaF_2$ lenses. In addition, lens system 102 is shown as having a positive optical power, and lens system 104 is shown as having a negative optical power, but the signs of the optical powers can be reversed.

Figure 4:
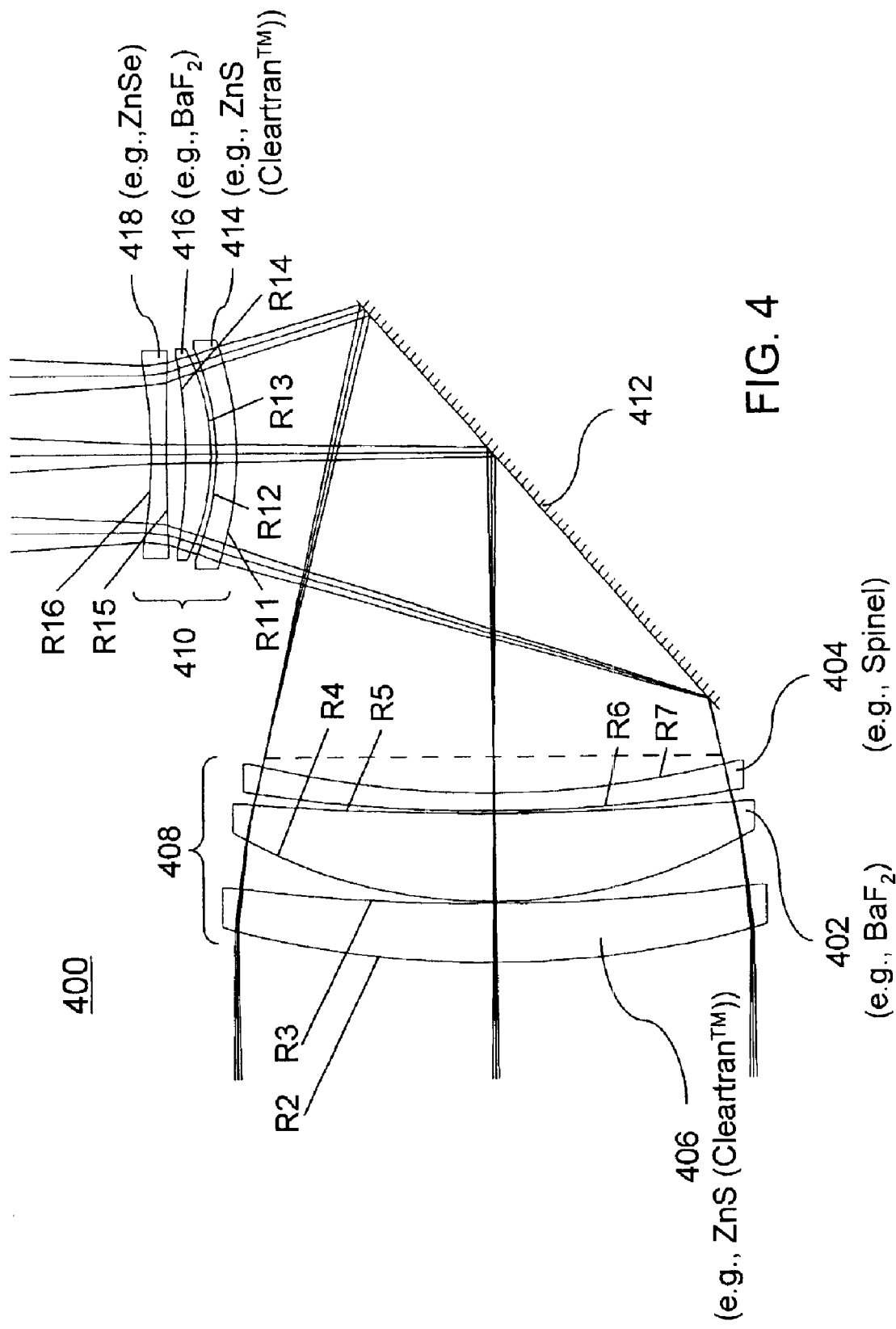
FIG. 4 is an illustration of an optical system according to an exemplary aspect of the present invention.

In addition, the refractive optical system can also comprise a third lens system comprising ZnS (e.g., a ZnS lens such as Cleartran™), such as illustrated by the exemplary dual optical system 400 shown in FIG. 4. The dual optical system 400 shown in FIG. 4 comprises an optical system 408 and another optical system 410. The materials of the optical system 408 can be chosen according to the teachings provided herein. The optical system 408 comprises a first lens system 402 comprising $BaF_2$ (e.g., a $BaF_2$ lens), a second lens system 404 (e.g., a spinel lens), and a third lens system 406 comprising ZnS (e.g., a ZnS lens such as Cleartran™). As illustrated in this example, the $BaF_2$ lens can be arranged between the ZnS lens and the spinel lens.

The dual optical system 400 is an a focal system and also comprises a fold mirror 412 disposed between the optical systems 408 and 410. The second optical system 410 can comprise, for example, a lens system 414 (e.g., a ZnS lens such as Cleartran™), a lens system 416 (e.g., a $BaF_2$ lens) and a lens system 418 (e.g., a ZnSe lens).

The optical system 408 can serve as a refractive objective lens system, and any suitable selection of optical materials can be made for the optical system 408 according to teachings herein to provide correction of chromatic aberration in first, second and third wavelength bands (e.g., 0.7–0.9 microns, 1.064–1.573 microns, and 3.3–5.0 microns, respectively). Similarly, any suitable selection of optical materials can be made for the optical system 410 to provide correction of chromatic aberration of the optical system 410. For implementations of dual optical systems in which one optical system has a significantly smaller value of "y" than the other optical system, "y" being reflected in Equations 9 and 10 for blur radii, the selection of materials for the optical system with the lower "y" value may be less important than the selection of materials for the optical system with the higher "y" value. This is because "y" appears as a multiplicative factor of $y^2$ in Equations 9 and 10.

The use of a ZnS lens 406 in the exemplary optical system 408 illustrated in FIG. 4 provides protection to the $BaF_2$ lens 402 and further provides additional correction of secondary chromatic aberration of the first optical system 408 in Band 3 (3.3–5.0 microns). The dual optical system 400 illustrated in FIG. 3 can be used to provide a parallel output from the second optical system 410. Tabular data of lens parameters for the exemplary dual optical system 400 is provided in Table V. The dual optical system 400 illustrated in FIG. 4 is not intended to be limited to the particular materials illustrated therein, and it will be recognized that substitutions of the various materials illustrated in FIG. 4 can be made using the teachings provided herein. For example, the highlighted combinations of materials illustrated in Table II can be used for first lens system 402 and the second lens system 404 in any configuration according to the teachings herein. As noted above, the first lens system 402 can comprise a $BaF_2$ lens, the second lens system 404 can comprise a spinel (or aluminum oxynitride) lens, and the third lens system 406 can comprise a ZnS lens. The $BaF_2$ lens can be arranged between the ZnS lens and the spinel (or aluminum oxynitride) lens.

According to another exemplary aspect of the invention, there is provided another refractive optical system transmissive to infrared radiation. The refractive optical system comprises a first lens system comprising $CaF_2$. The refractive optical system further comprises a second lens system comprising an optical material selected from spinel, sapphire, $MgF_2$, and aluminum oxynitride. In this regard, the exemplary optical systems illustrated in FIGS. 1 and 4 represent possible arrangements according to the present exemplary aspect, wherein $BaF_2$ is replaced with $CaF_2$. The considerations discussed above with regard to using $BaF_2$ as the first optical material in the systems described above are applicable to arrangements utilizing $CaF_2$ as the first optical material. For example, the refractive optical system can further comprise a third lens system comprising ZnS (e.g., a ZnS lens such as Cleartran™). In addition, the first lens system can comprise a $CaF_2$ lens, the second lens system can comprise a spinel (or aluminum oxynitride) lens, and the third lens system can comprise a ZnS lens. The $CaF_2$ lens can be arranged between the ZnS lens and the spinel (or aluminum oxynitride) lens.

Figure 5:
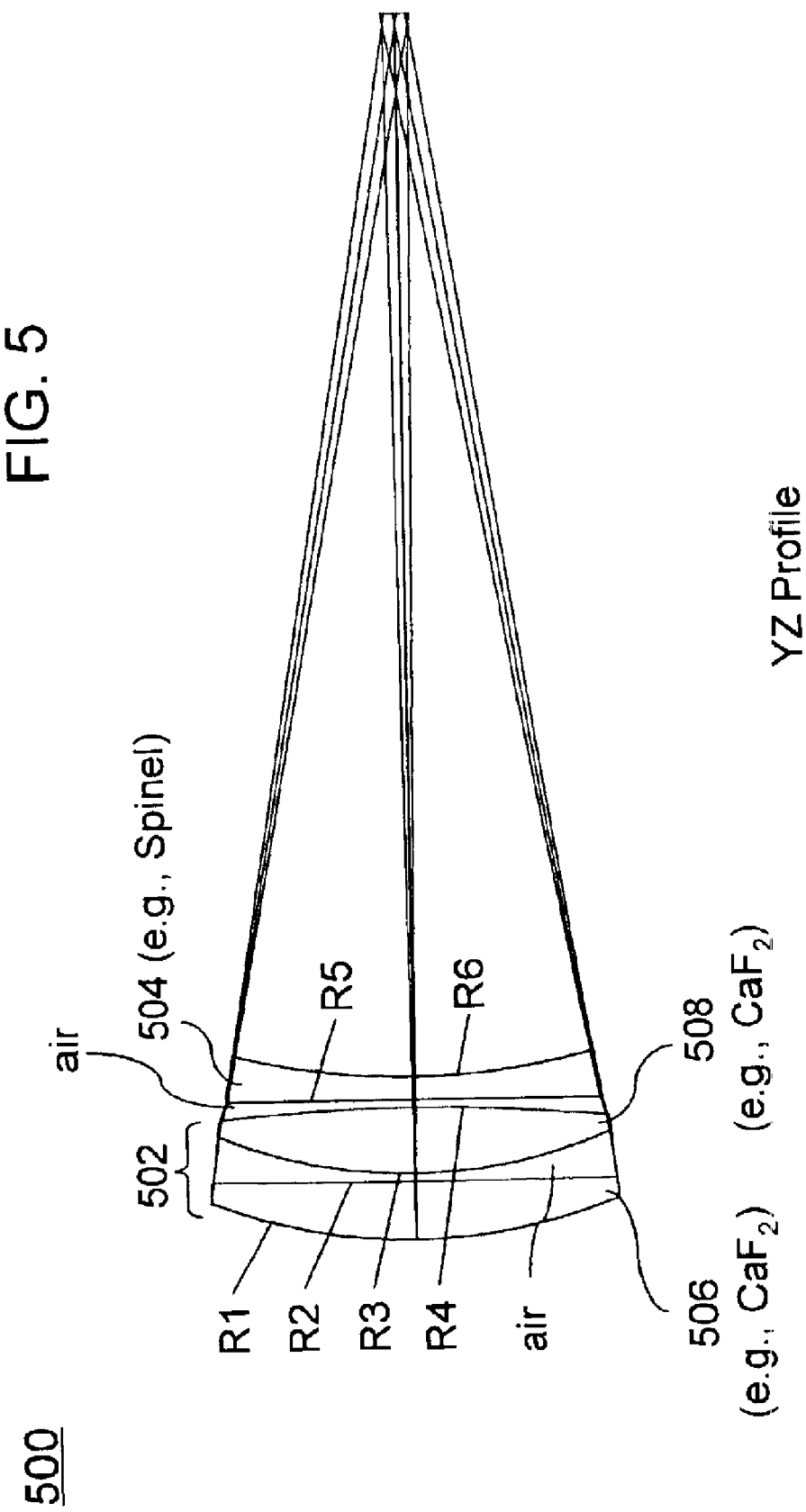
FIG. 5 is an illustration of an optical system according to an exemplary aspect of the present invention.

In addition to the exemplary arrangements illustrated in FIGS. 1 and 4, another exemplary optical system 500 according to the present invention is illustrated in FIG. 5. The optical system 500 comprises a first optical system 502 and a second optical system 504. In this example, the first optical system 502 comprises two lenses 506 and 508, both of which can be $CaF_2$ lenses, and the second optical system 504 comprises a spinel lens. For this exemplary configuration, the chromatic blur radii for exemplary wavelength bands of 0.7–0.9 microns, 1.064–1.573 microns, and 3.3–5.0 microns are 0.000001 inch, 0.005430 inch, and 0.006331 inch, respectively. In this exemplary design, the $CaF_2$ lens system has been split into two lenses to improve the monochromatic aberrations. The comparable chromatic blur radii for a $ZnS/CaF_2$ configuration are 0.000002 inch, 0.038318 inch, and 0.069052 inch. As shown in FIG. 5, the lenses 506, 508 and 504 can be separated by air. Exemplary parameters for radii of curvature of lens surfaces, lens thicknesses at the optical axis, and lens separations for the $CaF_2/CaF_2$/spinel example shown in FIG. 5 can be as follows: R1=7.942, R2=−93.510, R3=6.758, R4=−22.683, R5=−204.0, R6=10.22, lens 506 thickness=0.650, lens 508 thickness=0.750, lens 504 thickness=0.250, lens 506/508 separation=0.100, lens 508/504 separation=0.100 (all in inches). Of course, other material substitutions can be made for the exemplary optical system 500 in accordance with the teachings provided herein. For example, one or both of the $CaF_2$ lenses can be replaced with a corresponding $BaF_2$ lens, and the spinel lens can replaced with an aluminum oxynitride lens.

The present invention provides material combinations that permit simultaneous chromatic correction in several wavelength bands, e.g., 3.3–5.0 microns, 0.7–0.9 micron and 1.064–1.573 microns using a single-aperture, refractive solution, e.g. for a FLIR camera system. Prior practice for providing sensor capability from 0.7 microns to 5 microns was to use either (1) a second aperture for the NIR television or (2) a reflective optical system, either with or without a central obscuration. A system with a central obscuration reduces the sensitivity of the sensor suite and also interferes with the operation of the laser designator. To achieve a reflective design with no central obscuration requires that the reflective components be off-axis sections of mirrors. For an efficient package, such a system generally must have an intermediate focal plane. This is a disadvantage because a coaxial laser beam will come to focus at the intermediate focal plane, tending to cause air breakdown at the focal point.

Accordingly, the materials combinations provided by the present invention which allow use of a single aperture have advantages over the use of a second aperture, including the following: smaller gimbal; smaller diameter of pod containing sensors; more stable sensor boresight; simpler factory alignment; simpler gimbal design especially with regard to mechanical design and balance.

Moreover, the materials combinations provided by the present invention which allow a refractive solution have advantages over the use of a reflective optical system, including the following: smaller gimbal; smaller diameter of pod containing sensors; simpler gimbal design; simpler optical fabrication, especially in terms of optical surface finish and figure; optical design allowing FLIR wide field of view.

An additional feature of the material combination of $CaF_2$ and spinel, and of $BaF_2$ and spinel, is that with increasing temperature, the focal point of the objective lens system shifts away from the lens, rather than toward the lens as is the case with other materials. This is due to the large thermal expansion coefficient and negative dn/dT of $CaF_2$ and $BaF_2$. This thermal behavior can compensate for thermal focus shifts caused by structure and optical components elsewhere in the system. This characteristic provides potential for passive athermalization or at least smaller linear travel requirements on thermal focus mechanisms.

It should be noted that the terms "comprises" and "comprising", when used in this specification, are taken to specify the presence of stated features, steps or components; but the use of these terms does not preclude the presence or addition of one or more other features, steps, components or groups thereof.

The invention has been described with reference to particular embodiments. However, it will be readily apparent to those skilled in the art that it is possible to embody the invention in specific forms other than those of the embodiments described above. This can be done without departing from the spirit of the invention. The embodiments described herein are merely illustrative and should not be considered restrictive in any way. The scope of the invention is given by the appended claims, rather than the preceding description, and all variations and equivalents which fall within the range of the claims are intended to be embraced therein.

What is claimed is:

1. A refractive optical system transmissive to infrared radiation, comprising:

a first lens system comprising $BaF_2$; and a second lens system comprising an optical material selected from spinel, $MgF_2$, and aluminum oxynitride.

2. The refractive optical system of claim 1, where one of said lens systems has a positive optical power and the other of said lens systems has a negative optical power.

3. A refractive optical system transmissive to infrared radiation, comprising:

a first lens system comprising $BaF_2$;

a second lens system comprising an optical material selected from spinel, sapphire. $MgF_2$, MaO, and aluminum oxynitride; and a third optical system comprising ZnS.

4. The refractive optical system of claim 3, wherein the first lens system comprises a $BaF_2$ lens, the second lens system comprises a spinel lens, and the third optical system comprises a ZnS lens.

5. The refractive optical system of claim 4, wherein the $BaF_2$ lens is arranged between the ZnS lens and the spinel lens.

6. The refractive optical system of claim 3, wherein the first lens system comprises a $BaF_2$ lens, the second lens system comprises an aluminum oxynitride lens, and the third lens system comprises a ZnS lens.

7. The refractive optical system of claim 6, wherein the $BaF_2$ lens is arranged between the ZnS lens and the aluminum oxynitride lens.

8. A refractive optical system transmissive to infrared radiation, comprising:

a. a first lens system comprising $CaF_2$; and a second lens system comprising an optical material selected from spinel, sapphire, $MgF_2$ and aluminum oxynitride.

9. The refractive optical system of claim 8, wherein one of said lens system has a positive optical power and the other of said lens systems has a negative optical power.

10. A refractive optical system transmissive to infrared radiation, comprising:

a first lens system comprising $CaF_2$;

a second lens system comprising an optical material selected from spinel, sapphire, $MgF_2$ and aluminum oxynitride; and a third lens system comprising ZnS.

11. The refractive optical system of claim 10, wherein the first lens system comprises a $CaF_2$ lens, the second lens system comprises a spinel lens, and the third optical system comprises a ZnS lens.

12. The refractive optical system of claim 11, wherein the $CaF_2$ lens is arranged between the ZnS lens and the spinel lens.

13. The refractive optical system of claim 10, wherein the first lens system comprises a $CaF_2$ lens, the second lens system comprises an aluminum oxynitride lens, and the third lens system comprises a ZnS lens.

14. The refractive optical system of claim 13, wherein the $CaF_2$ lens is arranged between the ZnS lens and the aluminum oxynitride lens.

* * * * *

UNITED STATES PATENT AND TRADEMARK OFFICE
CERTIFICATE OF CORRECTION

PATENT NO. : 6,950,243 B2 Page 1 of 1
DATED : September 27, 2005
INVENTOR(S) : Gary E. Wiese et al.

It is certified that error appears in the above-identified patent and that said Letters Patent is hereby corrected as shown below:

Column 15,
Line 3, "a. a first lens system" should read -- a first lens system --.

Signed and Sealed this

Twenty-ninth Day of November, 2005

JON W. DUDAS
*Director of the United States Patent and Trademark Office*